(12) United States Patent
Plut

(10) Patent No.: US 8,610,742 B2
(45) Date of Patent: *Dec. 17, 2013

(54) GRAPHICS CONTROLS FOR PERMITTING BACKGROUND SIZE CHANGES

(75) Inventor: William Joseph Plut, Menlo Park, CA (US)

(73) Assignee: Transpacific Image, LLC, Wilmington, DE (US)

( * ) Notice: Subject to any disclaimer, the term of this patent is extended or adjusted under 35 U.S.C. 154(b) by 530 days.

This patent is subject to a terminal disclaimer.

(21) Appl. No.: 11/765,296

(22) Filed: Jun. 19, 2007

(65) Prior Publication Data

US 2007/0257941 A1    Nov. 8, 2007

Related U.S. Application Data

(63) Continuation of application No. 10/891,733, filed on Jul. 15, 2004, now Pat. No. 7,274,382.

(60) Provisional application No. 60/487,760, filed on Jul. 16, 2003.

(51) Int. Cl.
*G09G 5/00* (2006.01)
*G06F 3/048* (2006.01)

(52) U.S. Cl.
USPC ........... 345/660; 715/778; 715/781; 715/788; 715/798; 715/800

(58) Field of Classification Search
USPC ........... 715/778, 781, 788, 798, 800; 345/660
See application file for complete search history.

(56) References Cited

U.S. PATENT DOCUMENTS

| 3,793,483 | A | 2/1974 | Bushnell |
| 4,227,215 | A | 10/1980 | Gurley |
| 5,170,196 | A | 12/1992 | Itoh |
| 5,193,006 | A | 3/1993 | Yamazaki |
| 5,208,669 | A | 5/1993 | Richards |
| 5,216,504 | A | 6/1993 | Webb |
| 5,227,771 | A | 7/1993 | Kerr |
| 5,475,812 | A | 12/1995 | Corona |
| 5,477,241 | A | 12/1995 | Higgins |
| 5,572,259 | A | 11/1996 | Nohara |

(Continued)

OTHER PUBLICATIONS

OA dated Apr. 30, 2010 for U.S. Appl. No. 11/768,820, 30 pages.

(Continued)

*Primary Examiner* — Jeffrey Chow
(74) *Attorney, Agent, or Firm* — Turocy & Watson, LLP

(57) ABSTRACT

This invention provides systems and methods that allow a user to change the size of a background used with a graphics-based user interface. This enables tailored background sizes based on user preference and allowable conditions, which are particularly useful with display devices having a large display area. By custom sizing a background to current conditions, a user may navigate an image among obstacles at a receiving surface and obstacles along a projection path between a projection lens and receiving surface. In addition, a user may customize the background size on a large LCD screen according to more suitable dimensions for an image used in the background or to a personal preference, thereby creating a personalized look and feel for the graphics-based user interface. One embodiment of the present invention defines a usable area for a graphics-based user interface according to the current size of the background. Changing the background size in this case also then changes the usable area for the graphics-based user interface.

40 Claims, 5 Drawing Sheets

(56) References Cited

U.S. PATENT DOCUMENTS

| | | |
|---|---|---|
| 5,586,244 A | 12/1996 | Berry |
| 5,592,194 A | 1/1997 | Nishikawa |
| 5,642,476 A | 6/1997 | Turner |
| 5,657,049 A | 8/1997 | Ludolph |
| 5,657,463 A | 8/1997 | Bingham |
| 5,668,997 A | 9/1997 | Lynch-Freshner |
| 5,680,562 A | 10/1997 | Conrad et al. |
| 5,704,050 A | 12/1997 | Redpath |
| 5,757,358 A | 5/1998 | Osga |
| 5,764,241 A | 6/1998 | Elliott |
| 5,784,045 A | 7/1998 | Cline |
| 5,793,434 A | 8/1998 | Lee |
| 5,796,402 A | 8/1998 | Ellison-Taylor |
| 5,815,160 A | 9/1998 | Kikuchi |
| 5,838,321 A | 11/1998 | Wolf |
| 5,896,121 A | 4/1999 | Kafer |
| 5,901,319 A | 5/1999 | Hirst |
| 5,914,716 A | 6/1999 | Rubin |
| 5,978,051 A | 11/1999 | Gohman |
| 5,983,190 A | 11/1999 | Trower, II |
| 6,023,714 A | 2/2000 | Hill |
| 6,028,645 A | 2/2000 | Reid |
| 6,067,112 A | 5/2000 | Wellner |
| 6,076,169 A | 6/2000 | Lee |
| 6,195,068 B1 | 2/2001 | Suzuki |
| 6,215,490 B1 | 4/2001 | Kaply |
| 6,300,936 B1 | 10/2001 | Braun |
| 6,345,897 B1 | 2/2002 | Furuhata |
| 6,356,284 B1 | 3/2002 | Manduley |
| 6,367,933 B1 | 4/2002 | Chen |
| 6,396,520 B1 | 5/2002 | Ording |
| 6,404,458 B1 | 6/2002 | Kang |
| 6,426,836 B2 | 7/2002 | Dorsel |
| 6,437,787 B1 | 8/2002 | Wu |
| 6,456,305 B1 | 9/2002 | Qureshi |
| 6,462,868 B1 | 10/2002 | Giesberg |
| 6,466,193 B1 | 10/2002 | Anai |
| 6,471,356 B1 | 10/2002 | Gohman |
| 6,473,102 B1 | 10/2002 | Rodden |
| 6,481,852 B2 | 11/2002 | Osaka |
| 6,486,900 B1 | 11/2002 | Shen |
| 6,491,400 B1 | 12/2002 | Chen |
| 6,520,646 B2 | 2/2003 | Rodriguez, Jr. |
| 6,520,647 B2 | 2/2003 | Raskar |
| 6,583,779 B1 | 6/2003 | Ushirono |
| 6,594,090 B2 | 7/2003 | Kruschwitz |
| 6,606,103 B1 | 8/2003 | Hamlet |
| 6,750,832 B1 | 6/2004 | Kleinschmidt |
| 6,757,034 B2 | 6/2004 | Yu |
| 6,806,848 B2 | 10/2004 | Hirao |
| 6,807,010 B2 | 10/2004 | Kowarz |
| 6,864,921 B2 * | 3/2005 | Kaneda et al. ............... 348/383 |
| 6,963,348 B2 | 11/2005 | Diamond et al. |
| 7,274,382 B2 | 9/2007 | Plut |
| 7,292,252 B2 | 11/2007 | Matsuda |
| 7,623,135 B1 * | 11/2009 | Diamond et al. ............ 345/582 |
| 7,706,979 B1 | 4/2010 | Herwitz |
| 2002/0080176 A1 | 6/2002 | Nason |
| 2002/0158884 A1 | 10/2002 | Gonzalez et al. |
| 2003/0020757 A1 * | 1/2003 | Aratani et al. ............... 345/790 |
| 2003/0020885 A1 | 1/2003 | Suzuki |
| 2003/0071846 A1 * | 4/2003 | Balassanian ................. 345/769 |
| 2003/0085926 A1 | 5/2003 | Heynderickx |
| 2003/0142135 A1 | 7/2003 | Hori et al. |
| 2004/0036813 A1 | 2/2004 | Matsuda |
| 2004/0113939 A1 | 6/2004 | Zacks |
| 2004/0227911 A1 * | 11/2004 | Salvatori et al. ............. 353/122 |
| 2005/0017978 A1 | 1/2005 | Hatori |
| 2006/0048062 A1 * | 3/2006 | Adamson ..................... 715/760 |
| 2008/0012880 A1 | 1/2008 | Plut |

OTHER PUBLICATIONS

OA dated Sep. 29, 2010 for U.S. Appl. No. 11/768,820, 26 pages.
OA dated May 12, 2011 for U.S. Appl. No. 13/037,945, 36 pages.

* cited by examiner

GRAPHICS CONTROLS FOR PERMITTING BACKGROUND SIZE CHANGES

CROSS-REFERENCE TO RELATED APPLICATIONS

This application is a continuation of and claims priority under U.S.C. §120 from co-pending U.S. patent application Ser. No. 10/891,733, filed Jul. 15, 2004 and entitled "Customizable Background Sizes and Controls for Changing Background Size", which is incorporated herein for all purposes; the Ser. No. 10/891,733 patent application claimed priority under 35 U.S.C. §119(e) from U.S. Provisional Patent Application No. 60/487,760 filed Jul. 16, 2003 and entitled "CUSTOMIZABLE USER INTERFACE BACKGROUND SIZES", which is also incorporated by reference herein in its entirety for all purposes.

BACKGROUND

This invention relates to backgrounds used with graphics-based user interfaces. More particularly, the present invention relates to a background having an adaptable size that may be changed for individual computer applications, interactions, and users.

Computers and computer programs employ a graphics-based user interface to facilitate interaction between a user and a computer or between the user and a computer program run on the computer. The graphics-based user interface commonly employs a background, which includes a bitmap digitally represented by an array of pixel values.

Conventional backgrounds maximally fill the entire two-dimensional display area for a display device, such as a cathode ray tube (CRT) or liquid crystal display (LCD) screen. The background size cannot be manipulated, selected, or changed by a user—its maximal size remains singularly and stringently fixed.

Projectors offer image sizes having diagonal spans up to 30 feet. Imperfect and realistic environment conditions complicate the use of large projected images. It is common for light output by a projector to encounter physical obstacles—either along a projection path between a projector and receiving surface, at the receiving surface, or both. A projector used in an office or home may encounter a wide variety of projection path obstacles such as plants, bookshelves, chairs, miscellaneous furniture, etc., that limit where the projector is placed and where the image is cast. The lack of mobility for many projectors, such as those fixed into a ceiling and those that require a minimum throw distance, adds to projector and image placement difficulties. The stringency of maximum sized backgrounds offered by conventional graphics-based user interfaces amplifies these complications.

Based on the foregoing, improved backgrounds and graphics-based user interfaces would be desirable.

OVERVIEW

The present invention provides systems and methods that allow a user to change the size of a background used with a graphics-based user interface. This enables tailored background sizes based on user preference and allowable conditions, which are particularly useful with display devices having a large display area. For example, a user may reduce background size to 50 percent of the maximum image size allowed by a projector according to the allowable area of a receiving surface that the projector casts an image onto. By custom sizing a background to current conditions, a user may navigate an image among obstacles at the receiving surface and obstacles along a projection path between a projection lens and the receiving surface. Using graphics tools described herein, a user may customize a background size to a personal preference or an image used in the background. For example, a user may style a background size on a large LCD screen to a desired size and shape, thereby creating a personalized look and feel for the graphics-based user interface.

One embodiment of the present invention defines a usable area for a graphics-based user interface according to the current size of the background. Changing the background size in this embodiment also changes the usable area for the graphics-based user interface. This re-defines the visual limits for display of windows, graphics, browsers, and other visual output, and re-defines spatial limits for the use of pointers and other user input. Changing the background size may also relocate icons, control bars, and any other graphics components associated with visually output of the background.

In one aspect, the present invention relates to a background for use with a graphics-based user interface and for display using a display device. The background comprises background video information for display according to orthogonal image coordinates. The background also comprises a background size that is less than a maximum image size allowed by the display device when the background video information is for display without substantial keystone distortion. The background further comprises perimeter that bounds the background video information, borders the background size, and defines a usable area for the graphics-based user interface.

In another aspect, the present invention relates to a background for use with a graphics-based user interface and for display using a display device. The display device has a maximum image size when video information included in the background is for display without substantial keystone distortion. The maximum image size is characterized by maximum image size dimensions in first and second image directions. The background comprises video information for display according to orthogonal image coordinates. The background further comprises a perimeter that bounds the background video information and defines a usable area for the graphics-based user interface. The background also comprises a background size characterized by background dimensions in the first and second image directions. A background dimension in one of the first and second image directions is less than a corresponding maximum image size dimension in the first or second image direction.

In yet another aspect, the present invention relates to a graphics control for changing the size of a background used with a graphics based user interface. The graphics control comprises at least one background control tool including video information for display by a display device having a maximum image size when the video information is for display without substantial keystone distortion. The at least one background control tool allows a user to change the background size to a background size less than the maximum image size.

In still another aspect, the present invention relates to a graphics-based user interface for display using a display device. The graphics-based user interface comprises a background having an adaptable size and including background video information for display according to orthogonal image coordinates. The background video information is for output by a display device having a maximum image size when the background video information is for display without substantial keystone distortion. The graphics-based user interface also comprises a graphics control that allows a user to change the background size to a background size less than the maximum image size.

In another aspect, the present invention relates to a method for changing the size of a background associated with a graphics-based user interface. The method comprises displaying at least one background control tool that allows a user to change the background size. The method also comprises changing the background size in response to user input via the at least one background control tool.

In yet another aspect, the present invention relates to a computer readable medium including instructions for changing the size of a background associated with a graphics-based user interface. The computer-readable medium comprises instructions for displaying at least one background control tool that allows a user to change the background size. The computer-readable medium also comprises instructions for changing the background size in response to user input via the background control tool. Video information included in the background is for display without substantial keystone distortion before and after the background size change.

These and other features of the present invention will be presented in more detail in the following detailed description of the invention and the associated figures.

DESCRIPTION OF EMBODIMENTS

Figure 1:
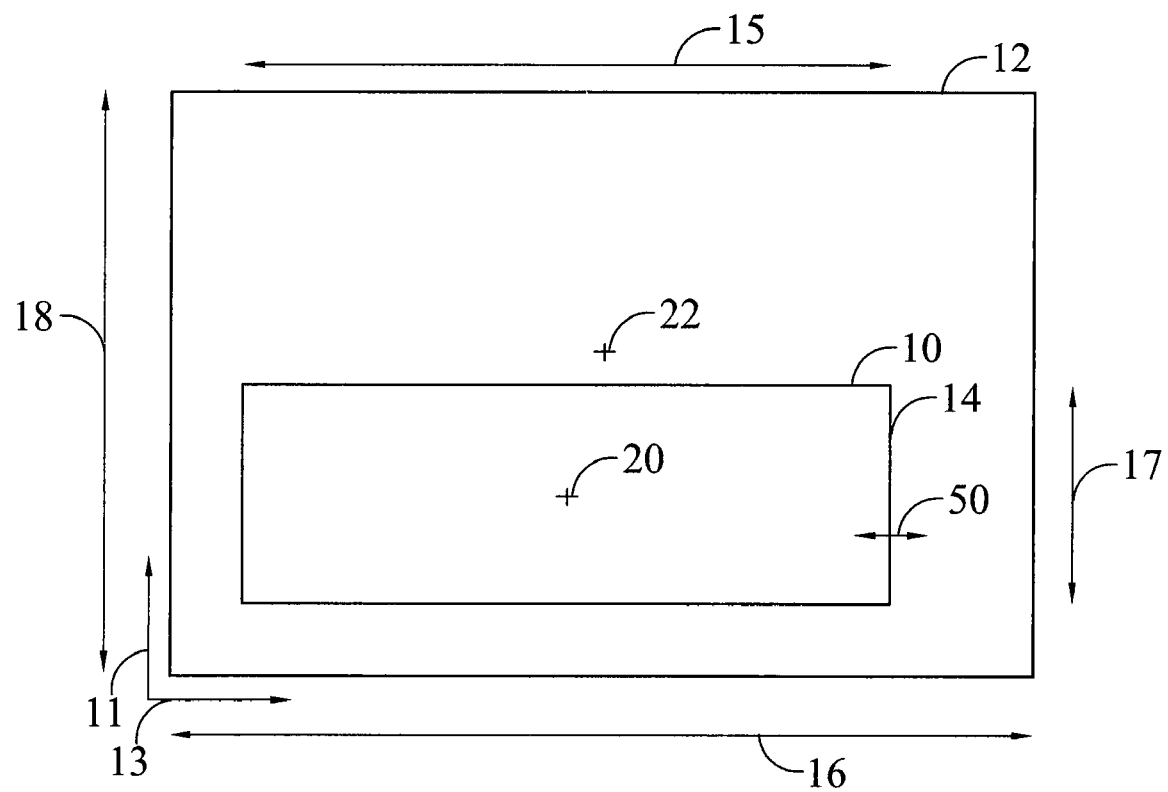
FIG. 1 illustrates a background having an adaptable size in accordance with one embodiment of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The present invention allows a user to customize a background size for a background used with a graphics-based user interface. Changing a background size as described herein reduces the image size to less than a maximum image size available from a display device. In some cases, a customized background enhances visual appeal of the background and improves look and feel for the graphics-based user interface. For example, a user may select or style a background to include an aspect ratio or shape that corresponds to a favorite picture or logo, thereby creating a personalized look and feel for the graphics-based user interface.

Since conventional backgrounds were stringently restricted to a single maximum size, users conformed to limited practice with a graphics-based user interface. The present invention, however, allows for expanded interaction between a user and graphics-based user interface. Interaction with a computer may be manipulated and personalized according to a background shape, size and aspect ratio, for example.

The present invention finds particular use with projectors used as a display device. Image size for a projector traditionally depended on mechanical factors such as the distance from a projector to the receiving surface and a splay angle for the projection lens. Obstacles at the receiving surface traditionally forced a user to move a projector closer to the wall to reduce image size. Any obstacles along the path between the projector and receiving surface also forced a user to move the projected image and/or projector. The present invention however enables a user to tailor a background size, thereby negating the effects of obstacles and maximizing image size based on specific projection conditions. For example, a user may tailor projector output used in a living room or office to navigate projection path or receiving surface obstacles that normally would obstruct the projection path and limit where the projector is placed, where the receiving image is cast, or limit image size.

The present invention also enables new uses for projectors. Cubicles and other portable office environments offer limited wall space. Projectors are currently not used in these environments due to the limited receiving surface space and projection path obstacles. The present invention however enables a worker within confined spaces such as this to tailor the background size and usable area to their local environment allowances. Thus, if the unobstructed wall space and projection path allow a rectangular image having an aspect ratio of 3:1, the user may tailor a background size to maximally fit the available area. Previously, the user would be forced to move the projector closer to the wall (if possible), maintain a 4:3 aspect ratio image set by the projector and graphics-based user interface, and therefore use less than half the available area.

FIG. 1 illustrates a background 10 having an adaptable size in accordance with one embodiment of the present invention. Background 10 is intended for use with graphics-based user interfaces employed by computing systems and devices that utilize a display device for visual output.

Background 10 comprises video information for display according to orthogonal image coordinates. The background video information refers to data for display according to a pixel arrangement to produce a visual representation of the data. The data is stored in a logical manner using values for each pixel, usually based on a given pixel resolution that may or may not match the display device resolution. Picture files used in a background commonly comprise video information stored as a bitmap, which comprises an array of luma and/or chroma values for each pixel in the stored image. Color bitmaps may be stored as ".BMP" files using pixel depths such as 8, 16, 24, and 32 bits. Other graphics formats, such as GIF, JPEG, and others, can also be used to store a background image.

The orthogonal image coordinates refer to a stored data format, positional arrangement for pixels, or an assumed output format for display of the video information. Pixel values are usually assigned or stored according to a positional arrangement of pixels in a planar image, such as a right angle x-y coordinate system. The x-y coordinate pixel locations are then used to determine where video data is output on an image, such as that provided by an LCD screen or an optical modulator included in a projector.

Characterizing video information according to orthogonal image coordinates denotes how they are stored and/or intended for display, and not necessarily how they are actually cast or displayed. Thus, the present invention anticipates that the output image may not always be truly orthogonal. For a CRT monitor for example, it is understood that the actual image coordinates may not always be perfectly orthogonal to a viewer, e.g. due to slight curvature in the output screen for CRT monitor. Image coordinates produced for a projected image may also not always be truly orthogonal. When a projection lens that outputs the video information for a projector has a central axis that is not perpendicular to a receiving surface, keystone distortion of the image may appear. Briefly, keystone distortion results from portions of a receiving surface being closer to the projection lens and other portions of the receiving surface being farther. Since image size for a projector depends on distance from the projection lens, image sizes for the closer receiving surface portions are smaller than those farther away. Keystone distortion often produces a trapezoidal image for rectangular video information intended for display according to orthogonal image coordinates. Many conventional projectors include a mechanical or digital keystone correction tool for reducing keystone distortion.

The present invention includes a background 10 size that is less than a maximum image size 12 allowed by a display device when the background 10 video information is for display without substantial keystone distortion. It is understood that correction of keystone distortion may not always produce perfectly orthogonal image pixels. More specifically, manual keystone correction often relies on user feedback to indicate when an image output by a projector has been substantially keystone corrected. Since this process is based on an individual user's acceptable viewing conditions and visual abilities, it is understood that images produced by projectors may not always include truly orthogonal image coordinates. Acceptable keystoning in this case may include up to 10 percent error, for example. Even projectors employing automated keystone correction, via a camera or other automated sensor to indicate an amount of potential distortion, may be subject to slight deviation from a true orthogonal image after the image has been substantially corrected.

Size changes to a background as described herein are independent of keystone correction. Thus, for an LCD screen that does not include keystone distortion issues, the present invention includes a background size that is less than the maximum image size allowed by the LCD screen. For a projector, changes in background size described herein may occur after keystone correction has occurred, if any. The background size changes are thus independent of changes made to attain an orthogonal image. In addition, size changes to a background as described herein are also independent of hardware tools or effects used to alter display device performance, such as hardware tools found on some CRT monitors that allow a user to shift or bow video output, or zoom tools that allow a user to magnify portions of an image without changing the image size.

Background 10 is output by a display device having a maximum image size 12. The maximum image size 12 implies that the display device has a finite size when the background video information is for display without substantial keystone distortion. For an CRT screen, OLED device, LCD screen or plasma-based display, there is typically no keystone distortion and the maximum image size 12 may be quantified according to maximal pixel dimensions for the optical modulator, or measured according to maximal linear dimensions that span the display area. Maximum image size 12 is independent from any orthogonal imperfections in the device such as screen curvature in a CRT device; and also encompasses any manual and optical adjustments made to the image using tools on the display device, such as hardware outer screen size manipulations permitted by some CRT monitors.

For a projector, maximum image size 12 may be characterized using the maximum pixel dimensions for an optical modulator producing the image when the background video information is for display without substantial keystone distortion. Thus, maximum image size 12 is typically limited based on the optical modulation device (DMD or LCD) resolution. Maximum linear dimensions for a projector will vary with the distance between the receiving surface and projector output lens, as well as a splay angle for the projector, but may be measured on the image—after any keystone distortion has been suitably corrected for. When the background video information is for display with substantial keystone correction, maximum image size 12 is the maximum image size available after any keystone distortion has been substantially corrected for.

A perimeter 14 of background 10 bounds background video information included in background 10 and acts as a border for the background size and shape. The perimeter 14 comprises the outermost pixels for the image, such as the outer pixels for a bitmap picture fit to the reduced size.

In one embodiment, perimeter 14 also determines an allowable usable area for the graphics-based user interface. The usable area defines visual output limits and user input limits for the graphics-based user interface. Thus, the usable area establishes spatial limits for display of graphics used by programs operated with the graphics-based user interface. For example, perimeter 14 determines the visual limits for the display of pointers, windows, graphics controls, browsers, and other visual output included in the graphics-based user interface or programs run on a computer that employs the graphics-based user interface. In a specific embodiment, background 10 size limits dimensions for a window opened or displayed at full size. Similarly, a window browser opened at full size may be limited in size, shape and aspect ratio to perimeter 14, minus any space reserved for tool bars and other constantly visible graphics components. Perimeter 14 also determines the limit for user input, such as manipulating a pointer, opening a window, expanding or moving a window, moving a graphics control or other graphics components, etc. In addition, perimeter 14 defines spatial limits that bound programs and program actions associated with the graphics-based user interface.

Regions of maximum image size 12 outside of perimeter 14 remain visually unused. In one embodiment, the graphics-based user interface converts visual information outside perimeter 14 to an off state, zero or black. For example, the graphics-based user interface may convert any pixel values for pixels outside perimeter 14 to zero or black for visual information output by programs associated with the graphics-based user interface, e.g., a screen saver would be black or off for pixels outside perimeter 14. For an LCD screen, back generated light may be fully blocked outside of perimeter 14 to create the appearance of black. For a projector, the optical modulator may not transmit light for these regions. In one embodiment, bitmaps stored for backgrounds of the present invention include zero values for pixels outside perimeter 14.

In this embodiment, changing an aspect ratio or shape for background 10 also changes perimeter 14 and the usable area. The new perimeter 14 then defines the new limits for the usable area.

The size of background 10 may be characterized in a number of ways. One suitable technique for characterizing background 10 size uses two linear dimensions defined in the image plane. A two-dimensional image may be characterized by an outer width and orthogonal outer length. As described herein, 'width' refers to the horizontal dimension of a two-dimensional image, while 'length' refers to the vertical dimension. As shown in FIG. 1, first and second orthogonal image directions 11 and 13 characterize maximum image size 12. An LCD screen for example comprises an orthogonal width 16 and length 18 that span the display area of the device (e.g., 12 in. by 9 in., respectively). An area quantifying maximum image size 12 is then easily determined. A similar quantification may be made for other display devices, including images produced by a projector after suitable keystone correction. Directions 11 and 13 are also useful to quantify background 10 size. More specifically, background 10 may be defined by background dimensions 15 and 17 in directions 11 and 13, respectively. As shown in FIG. 1, both background dimensions 15 and 17 are less than maximum image size dimensions 16 and 18 in directions 11 and 13, respectively.

Another suitable technique for characterizing background 10 size uses the total number of pixels included in background 10. When the maximum image size 12 for the display device is similarly quantified, the present invention may characterize background 10 size relative to the maximum image size 12. For example, an LCD screen may have a resolution of 1600 by 1200 pixels, resulting in a maximum image size of 1,920,000 pixels. In one embodiment, background 10 has a non-quadrilateral shape and comprises an area based on a pixel count or similar quantification that approximates the non-quadrilateral size.

A user, using a graphics control as described below, may then input a desired ratio or percentage for background 10 size based on the maximum image size 12. The user may also input a preferred shape or aspect ratio (for a rectangular background). A processor or video adapter associated with the graphics control converts background video information included in background 10 according to the new size, including resolution down and/or up conversion of the video information, if needed. In one embodiment, background 10 has a size that is less than about 80 percent of maximum image size 12. In another embodiment, background 10 has a size that is less than about 50 percent of maximum image size 12. In another reduction embodiment, background 10 has a size that is less than about 30 percent of maximum image size 12.

The present invention also enables a user to position a smaller background within the maximum image size 12. As illustrated in FIG. 1, background 10 has a geometric center 20 that is offset from a geometric center 22 of the display device. The geometric center 22 is defined by a geometric center for the maximum image size 14.

Figure 2:
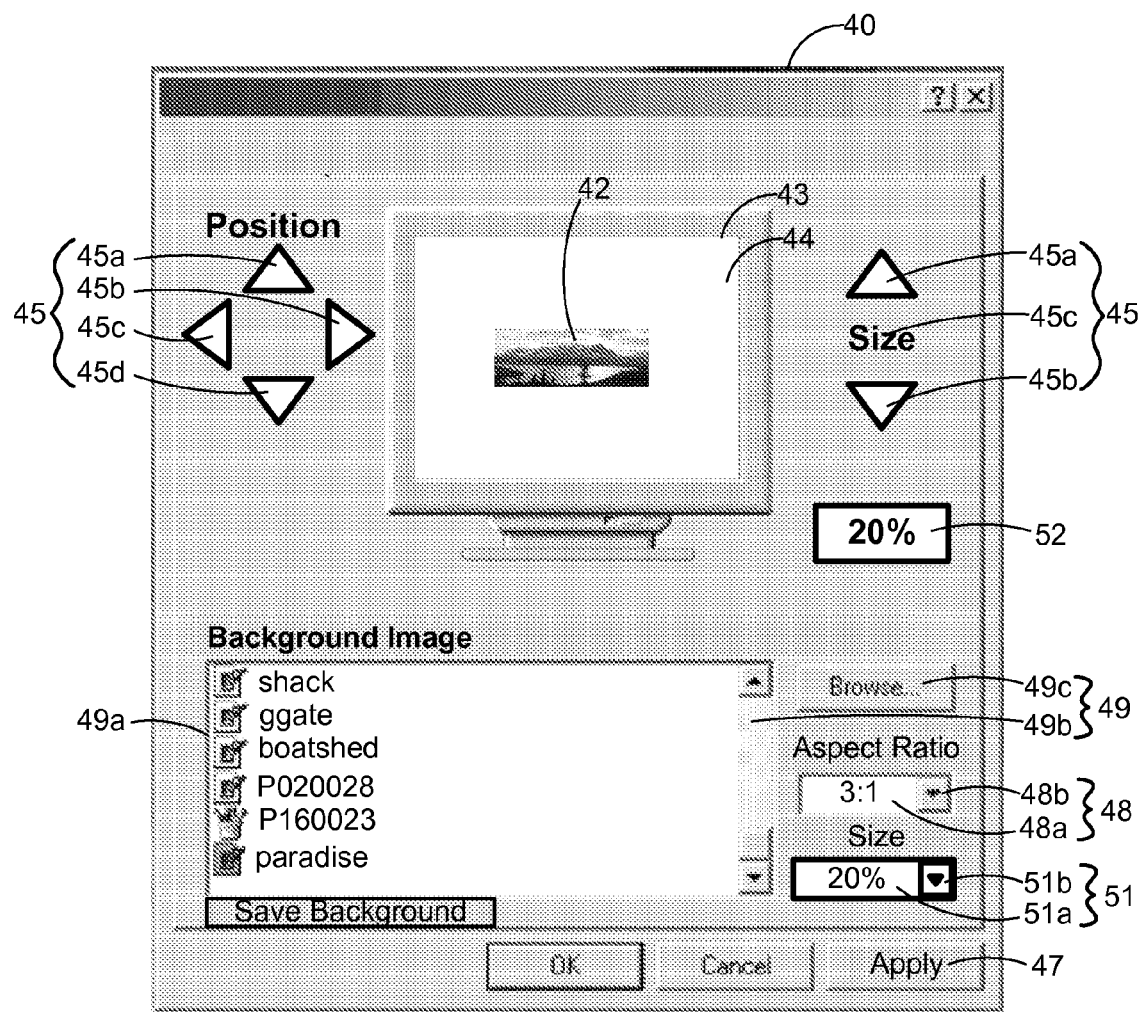
FIG. 2 illustrates a background graphics control for changing the size of a background in accordance with one embodiment of the present invention.

Graphics-based user interfaces employ what are referred to as "graphics controls". A graphics control is a discrete video object, for display by a display device, which can be manipulated by a user to change one or more graphics outputs or effects and/or to initiate an action in an associated application program. The graphics control often includes its own bitmap comprising an array of pixel values. FIG. 2 illustrates a background graphics control 40 for changing the size of a background in accordance with one embodiment of the present invention. While the present invention will now be described as graphics systems and components useful for changing the size of a background, those skilled in the art will recognize that the subsequent description may also illustrate methods and discrete actions for changing the size of a background.

Background graphics control 40 facilitates interface between a user and a program run on the computer that allows the user to change the size of a background. Background graphics control 40 comprises a number of background control tools 42-49 for display to a user. Current background display 42 provides the user a visual indication of the current background size and shape. A display device 43 is also illustrated to provide an indication of the relative size between the current background display 42 and the maximum image size 44 for display device 43.

Background size control tool 45 includes two buttons that allow a user to change the current background display 42. A first button 45a allows a user to increase the current background display 42 size, while a second button 45b allows a user to decrease the current background display 42 size. Either button allows a user to change the background size to less than the maximum image size 44. The buttons 45a and 45b have a textual label 45c that, along with their pictorial representations, describes their button function. The user may select a button by moving an on-screen pointer or manipulanda to the button and pressing a key. The graphics-based user interface interprets this selection as an instruction from the user, and performs the function related to the button's label. Background size control tool 45 changes the current background display 42 size without changing the background shape or aspect ratio.

Background position control tool 46 includes four buttons that allow a user to position the current background display 42 within maximum image size 44. The four buttons 46a, 46b, 46c, and 46d allow a user to move the current background display 42 up, right, left, and down, respectively.

A user may also position current background display 42 using point and drag functionality. More specifically, many graphics-based user interfaces allow a user to 'drag' graphics components by moving an on-screen pointer or manipulanda within background display 42, pressing a key, and moving current background display 42 while the key is pressed. The current background display 42 assumes the position it has when the key is released.

An apply button 47 allows a user to initiate changes made within graphics control 40 to current background display 42 onto the actual background for the graphics-based user interface. Thus, after changes to current background display 42 are finished, the user may click apply button 47 to implement any background changes.

Background aspect ratio control tool 48 includes a text input window 48a that allows a user to manually input a new aspect ratio for an about rectangular background. For example, a user may move an on-screen pointer or manipulanda to text input window 48a, click a mouse button or key within the window to gain access, and input a desired aspect ratio using a keyboard or numeric pad. Aspect ratio control tool 48 characterizes the aspect ratio for current background display 42 according to width:length. A scroll tool 48b provides a user access to a set of preset background aspect ratios that allow the user to user to select a predetermined aspect ratio from the set. Common aspect ratios in the scroll set may include 3:1, 11:6, 4:3, 2.35:1, 16:9, 2:3, 2:4 and 4:1, for example. Aspect ratio options may also be normalized for length. In this case, the aspect ratio is quantified as width divided by length to length. Some examples include 2.1:1, 2.35:1, 1.85:1, 2.55:1, 2.76:1 and 1.77:1. After the ratio is entered, current background display 42 may adapt to the new aspect ratio input to illustrate the change.

A user may also change the aspect ratio for an about rectangular background display 42 using click and drag functionality. Many graphics-based user interfaces allow a user to change window sizes by moving an on-screen pointer or manipulanda to an edge of a window, pressing a key, and changing the window size while the button is pressed. Similarly, graphics control 40 allows a user to an aspect ratio for current background display 42 by moving an on-screen pointer or manipulanda to an edge of a current background display 42, pressing a key, and changing the rectangular dimensions of the current background display 42 while the button is pressed. The current background display 42 assumes the new aspect ratio it has when the key is released.

Click and drag functionality may also be used outside of graphics control 40 to change the size of a background. In this embodiment, a user may move an on-screen pointer or manipulanda to an edge of background 10 (FIG. 1). At this point, an arrow 50 appears on perimeter 14 and points in a direction normal to a direction for the edge on which it appears. The user may then press a key, and change the rectangular dimensions of the background 10 while the button is pressed in the normal direction.

Alternatively, the control tools may comprise a scroll wheel and a keyboard key and the user changes the background or graphics component size by using the scroll wheel and keyboard key in unison. For example, the background control tool may comprise a scroll wheel disposed on a mouse and a predetermined control key, and the user changes background 10 by positioning a pointer on a header portion of background 10, and using the scroll wheel and control key in unison. In response to the dual input, the background size uniformly changes size in both orthogonal image directions. Background 10 assumes the new size it has when the key is released. In this manner, the user may change background 10 to any size less than the maximum image size.

Returning to FIG. 2, background size control tool 51 includes a text input window 51a that allows a user to change the current background display 42 by inputting a new percentage size for current background display 42 relative to the maximum image size 44 for display device 43. The percentage may be based on quantifications of area for background display 42 and maximum image size 44 based on pixel count or area, optical modulation area, or image area. Thus, size control tool 51 allows a user to change the current background display 42 size to a background size less than the maximum image size 44 based on a percentage. A scroll tool 51b provides a user access to a set of preset background percentage sizes that allow the user to user to select a predetermined percentage size from the set. Common sizes in the scroll set may include 80%, 60%, 50%, 40%, and 25%, for example. Background size control tool 51 changes the current background display 42 size according to the new percentage size without changing the background shape or aspect ratio.

Background image control tool 49 includes an image window 49a that allows a user to select an image for current background display 42. A set of bitmaps and other image files is displayed within window 49a. A scroll bar 49b allows the user to navigate among a large number of image files. Background size control tool 49 changes the video information in current background display 42 according to the video information included in the selected image file. In one embodiment, current background display 42 automatically adapts to an aspect ratio for the video information included in the selected image file, such as a panoramic image. Background image search tool 49c allows a user to browse for an image file within a computer file directory stored in memory.

Some of the background control tools 42, such as current background display 42 and image control tool 49, use visual output for user feedback. Video information included in the background control tools 42 is configured for display by a display device having a maximum image size when the video information is for display according to orthogonal image coordinates and without substantial keystone distortion.

Background size quantification tool 52 includes a text display that quantifies and shows the current size of background display 42. The quantification may be made using a pixel count for the current background display 42, a square approximation using orthogonal dimensions, or a percentage of maximum image size 44 (shown), for example.

In addition to the specific tools described above, background control tools for graphics control 40 may include combinations of common conventional graphics control tools such as buttons, options, scroll bars, pictures, spin dials, list boxes, text boxes, etc. For example, a check box is a control tool that comprises an empty box. When a user selects the box, it is filled with an "X" or other suitable information to indicate that the user has selected an option corresponding to the box. One or more check boxes may be used to allow a user to quickly select from one or more predetermined background sizes, such as those corresponding to a percentage of the maximum image size. Graphics control 40 also includes a 'cancel' button that closes graphics control window 40 without initiating any changes made to the current background display 42, and an 'OK' button that closes graphics control window 40 and applies any changes as described above with respect to apply button 47.

Figure 3:
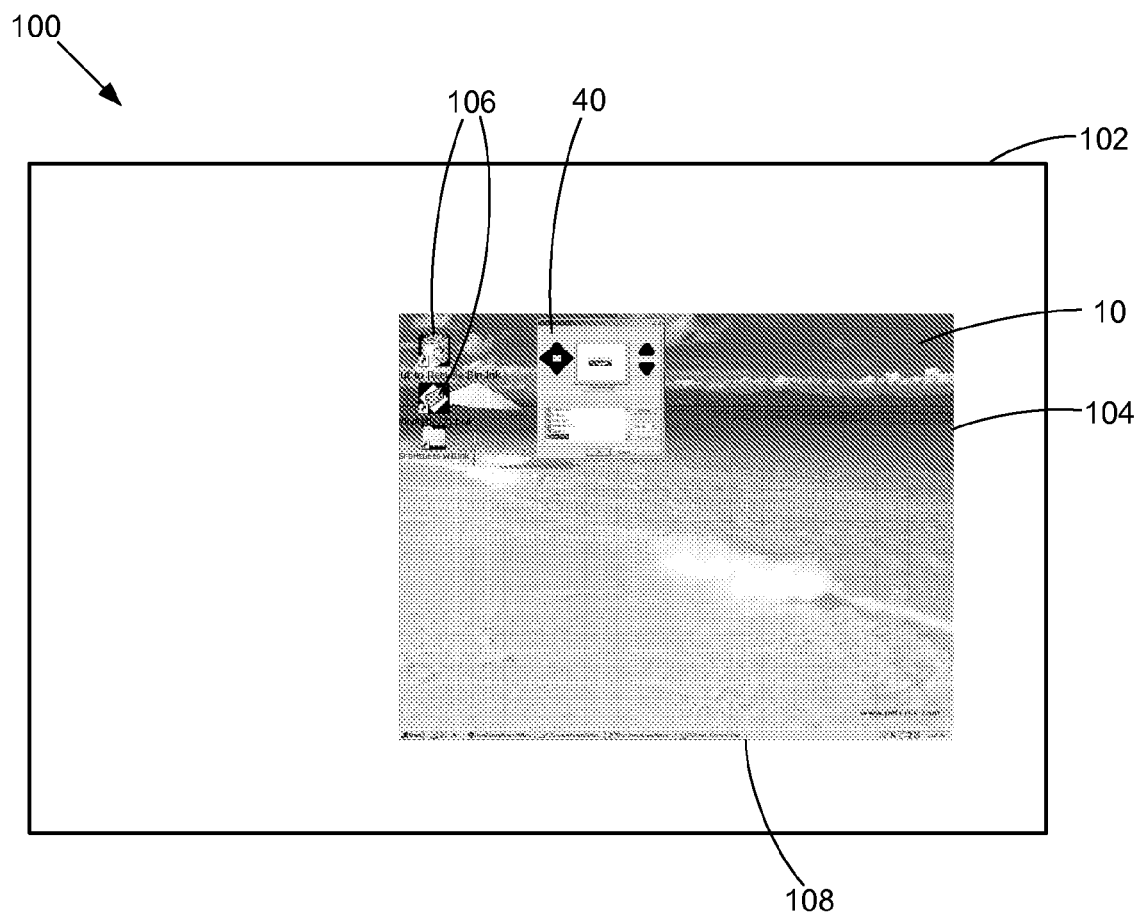
FIG. 3 illustrates a graphics-based user interface including a background having an adaptable size and a graphics control for changing the background size in accordance with one embodiment of the invention.

FIG. 3 illustrates a graphics-based user interface 100 including background 10 and graphics control 40 in accordance with one embodiment of the invention. Graphics-based user interface 100 is suitable for use with computers and computer programs to facilitate interaction between a user and a computer or between the user and a computer program run on the computer. Graphics-based user interface 100 is for display using a projector having a maximum image size 102 when the video information included in background 10 is for display without substantial keystone distortion.

Background 10 has an adaptable size and includes background video information for display according to orthogonal image coordinates. A perimeter 104 of background 10 defines a usable area for graphics-based user interface 100. Perimeter 104 thus determines the boundary for use and display of user interface components and tools such as pointers, windows, graphics controls, Internet browsers, and other visual output included in the graphics-based user interface. Background 10 underlies any temporary and constant graphics components displayed by graphics-based user interface 100. Temporary graphics components may include graphics control 40, word processing windows, pictures, files, etc. Disposed proximate to perimeter 104 are constant graphics components such as icons 106 and a control bar 108. Changing the size of background 10 relocates the positions of icons 106 and control bar 108 according to a new perimeter 104 of background 10.

Graphics control 40 allows a user to change the size of background 10 to a background size less than the maximum image size 102. Graphics control 40 comprises a number of background control tools for display to a user. One background control tool allows a user to increase or decrease the current background 10 to a size less than the maximum image size for the display. Another background control tool allows a user to position the background 10 within a maximum image size. Other background control tools may allow a user to a) manually input a new aspect ratio for an about rectangular background 10, b) input a new percentage size for current background display 42 relative to the maximum image size, c) to select an image for background 10.

Figure 4:
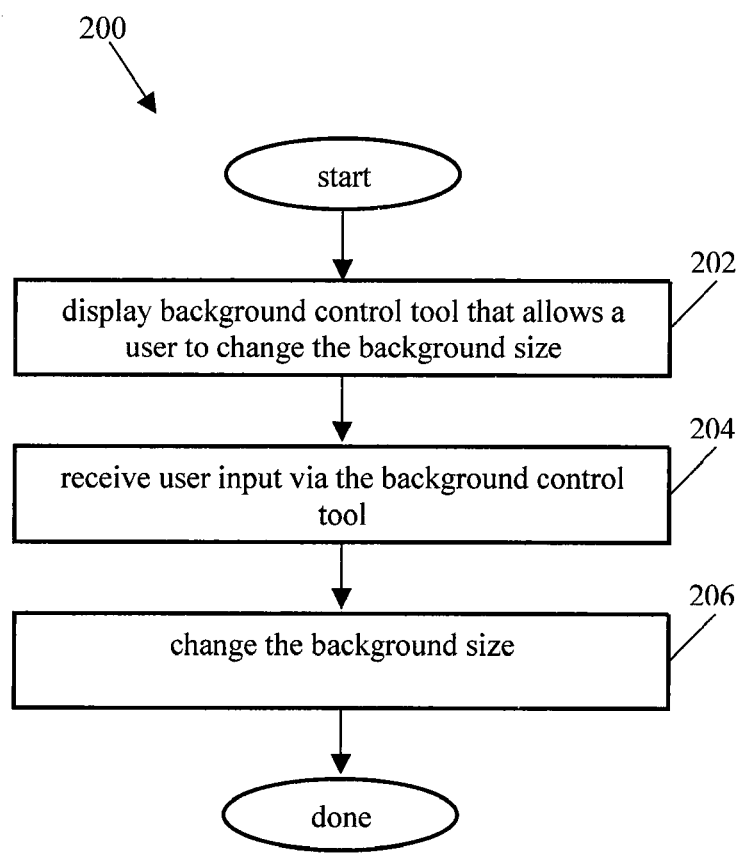
FIG. 4 illustrates a process flow for changing the size of a background associated with a graphics-based user interface in accordance with one embodiment of the invention.

FIG. 4 illustrates a process flow 200 for changing the size of a background included with a graphics-based user interface in accordance with one embodiment of the invention. While the present invention will now be described as a method and separable actions for changing the size of a background, those skilled in the art will recognize that the subsequent description may also illustrate computer and software systems and components capable of performing the method and actions.

Process flow 200 begins by displaying at least one background control tool that allows a user to change the background size (202). A suitable graphics control comprising numerous background control tools is described with respect to FIG. 2. The graphics control is accessible to a user via one or more locations or operations in the graphics-based user interface. For example, a user may right click a mouse of other input within the background to gain access and display the graphics control window. Before the background control tool is displayed, process flow 200 may also include keystone correction of video output from a projector, if any keystone distortion is present. Many conventional projectors mechanically or digitally, and manually or automatically, adapt video information to provide an image that more or less corrects for keystone distortion.

Using the background control tool, a user then inputs a desired background size or changes the current background size as desired (204). Input may constitute linear dimensions for an LCD screen or CRT monitor, such as a desired 12 in. by 4-inch background for on an LCD screen having a 12 in. by 9 in. maximum image size. For a projector, user input may comprise a percentage of the maximum image size allowed by the projector when the background video information is displayed without substantial keystone distortion. Either way, the user may increase or decrease the background size to a size less than a maximum image size for the display device. Input may also comprise selecting an image or bitmap having video information for use in the background, inputting an aspect ratio for the background, and positioning the background within the maximum image size. In one embodiment, a visual indication of the background size and shape is displayed to the user before any change is made. Before applying any change, the user may re-size the background as desired, e.g., from a 12 in. by 4-inch background to a 6 in. by 9-inch size.

In one embodiment, process flow 200 is used in conjunction with a projector as the display device. In this case, a user may manipulate the background size according to an allowable projection path for the image or allowable area for receiving surface. Thus, a background may be manipulated in its outer dimensions to avoid visual obstacles in projection path or on the receiving surface. For example, a background may be vertically raised by a user to avoid pictures on a desk or horizontally shifted to sidestep a cabinet, filing area or other vertical obstacle.

After the user finishes inputting changes to the background size, a video adapter or processor associated with the graphics-based user interface then changes the background according to the new background size (206), which may also comprise changing the background video information. To do so, the video adapter or processor may interrogate the display device to determine display properties of the display device, such as the display device resolution, native aspect ratio, and full-size dimensions. If the resolution for the background image or bitmap does not match the resolution provided according to the current background size and resolution of the display device, the graphics adapter or processor may alter the video information in the background bitmap. Alteration may include resolution down conversion and/or up conversion on the background video information, in equal or unequal quantities in the orthogonal image directions.

For example, if the background bitmap has a higher resolution than the current background size, the video adapter or processor may down convert video information in the bitmap according to the resolution available in the background size input by the user. Thus, if the user input a background size of 25% relative to the maximum image size, and the projector includes an optical modulator that offers 1024 by 768 resolution, then the current background size offers a 512 by 384 resolution. The graphics adaptor then down converts a bitmap having a 1024 by 768 resolution by a factor of 2 equally in both image directions to fit the current 512 by 384 resolution. Similarly, the graphics adaptor down converts a bitmap having an 800 by 600 resolution by a factor of 1.5625 equally in both image directions to fit the same resolution and background size input by the user. The user may then position this smaller image within the maximum image as desired. In a specific embodiment, the default location for a smaller image is the geometric center for the maximum image size, and the user moves the image from this location using a suitable background position control tool.

If the user input a desired background size or an aspect ratio that varies from the native aspect ratio of the background bitmap, then the video adapter may alter the video information in the bitmap to fit the current size as determined by the differing resolution ratios between the background bitmap and the current background size in each orthogonal image direction. Background bitmaps most commonly use a 4:3 aspect ratio to comply with the default 4:3 aspect ratio used by older CRT and LCD screens. For example, given a projector offering a 1024 by 768 resolution, user input for a 2:1 aspect ratio, and a 50% image size relative to the maximum image size; the current background size offers an 886 by 443 resolution. The amount of resolution conversion for an image may then be determined according to the ratio of resolution for the bitmap relative to the resolution currently offered by the background size. For example, the graphics adaptor may unequally down convert a 1024 by 768 resolution bitmap by a factor of 1.156 in the width (x) direction and by a factor of 1.734 in the length (y) direction to fit the allowable 886 by 443 resolution. Alternately, for the same background size conditions, the graphics adaptor may up convert a 800 by 600 resolution bitmap by a factor of 1.107 in the width (x) direction and down convert by a factor of 1.354 in the length (y) direction to fit the allowable 886 by 443 resolution background. Resolution up conversion and down conversion are techniques known to those skilled in the art and not described in further detail here for the sake of brevity.

Any bitmap or graphics image can be used for a background with the present invention. In a specific embodiment, the bitmap is originally for display to the user according to a default size based on the resolution used in the bitmap, the resolution used by display device, and the current background size. For example, a bitmap comprising an 800×600 pixel resolution is originally displayed on an LCD having a 1600 by 1200 pixel resolution using the centermost 800=600 pixels. This default size is then displayed as the current background size for the background. The user may then elect to increase or decrease the background size accordingly. Background bitmaps may also be created and customized using popular graphics programs such as those available from Adobe Systems Inc. of San Jose, Calif. or Microsoft of Redmond, Wash.

The present invention recognizes that graphics-based user interface design and interaction varies widely and encompasses any suitable techniques used to accept user input or change the background size based on user input. For example, some embodiments may display an arrow that operates as the background control tool in response to user placement of a pointer at a perimetric portion of the background (202). User input in this case may comprise moving the arrow or a side that the arrow is displayed on (204). In response to arrow movement, the background size changes in a direction of the arrow by an amount the arrow is moved (206). In one embodiment, changing the background size creates a new usable area for the graphics-based user interface according to the new background size. This may also include repositioning icons and control bars according for the new perimeter of the background. In another embodiment, corners of the background are used as references positions for the icons and control bars, regardless of background size.

After any changes, the graphics-based user interface may store an altered bitmap based on the changes to ease continual usage of the altered bitmap. As mentioned above, changing the background size as described herein is independent of keystone correction. The altered bitmap is then stored independent of keystone correction. Storage may alternatively include quantification of any keystone correction applied when the image was stored. Recall of the background may also then include a check to the projector to determine if the similar or different keystone correction is being used, and whether any changes in the digital image are needed.

Figure 5:
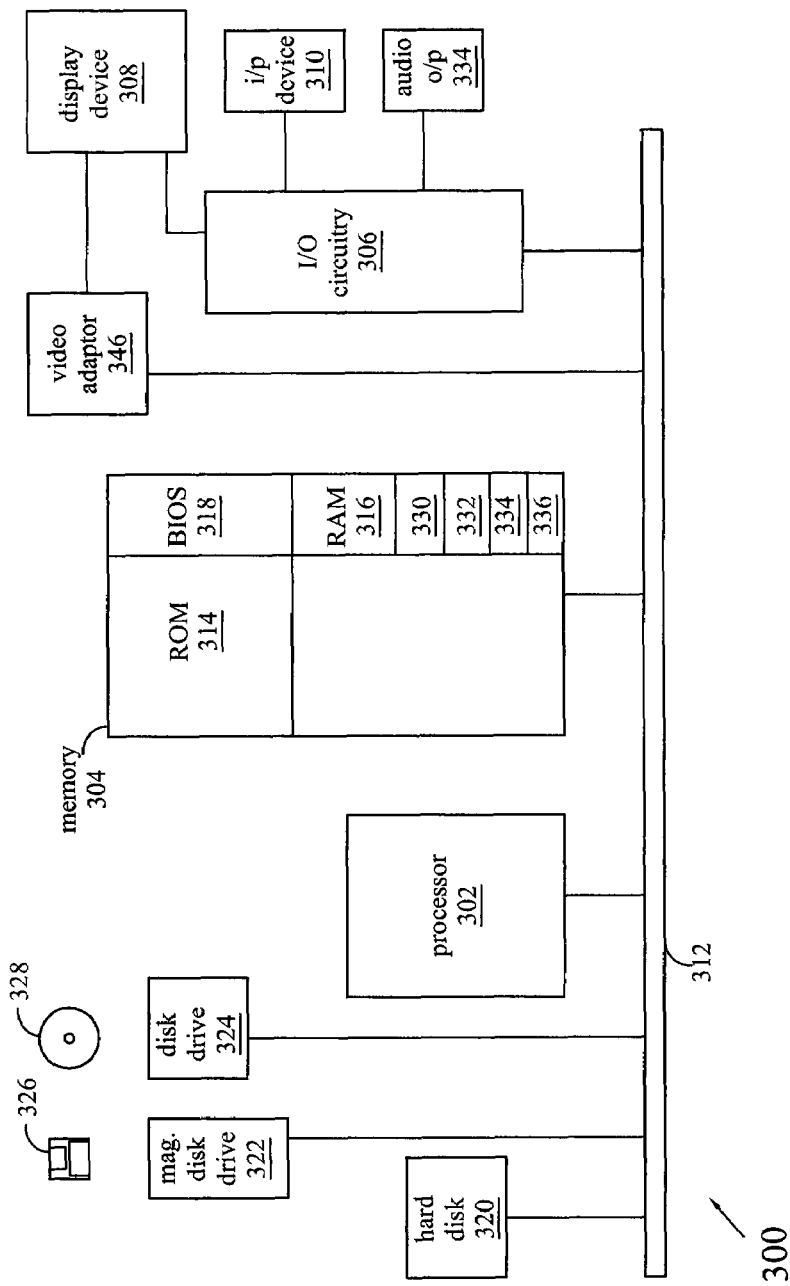
FIG. 5 illustrates an exemplary computer system suitable for implementing the invention.

The present invention finds use with computer systems such as desktop and laptop computers, personal digital assistants (PDAs), and the like. FIG. 5 illustrates an exemplary general-purpose computer system 300, representing a personal computer suitable for implementing the present invention.

Computer system 300 comprises a processor, or CPU, 302, system memory 304, input/output (I/O) circuitry 306, display device 308, input device 310, and system bus 312. System bus 312 permits digital communication between system memory 304 and the processor 302, as well as permits digital communication between other components within system 300 and processor 302 and/or system memory 304.

System memory 304 includes read only memory (ROM) 314 and random access memory (RAM) 316. ROM 314 stores a basic input/output system 318 (BIOS), containing basic routines that help to transfer information between elements within computer system 300, such as during start-up. Computer system 300 may also include a hard disk drive 320, a magnetic disk drive 322, and an optical disk drive 324. Magnetic disk drive 322 reads from and writes to a removable floppy disk 326. Optical disk drive 324 reads from and may write to a CD-ROM disk 328 or other optical media. The drives and their associated computer-readable media provide nonvolatile storage for system 300. A number of program modules may be stored in the drives, system memory 304, and/or RAM 310, including an operating system 330, one or more application programs 332, other program modules 334, and program data 336. Although the description of computer-readable media above refers to a hard disk, a removable magnetic disk and a CD-ROM disk, those skilled in the art will appreciate that other types of media are readable by a computer system, such as magnetic cassettes, flash memory cards, digital video disks, and the like. In addition, not all computer systems, such as PDAs and other portable devices may include every components shown with respect to system 300.

Processor 302 is a commercially available microprocessor such as one of the Intel or Motorola family of chips, or another suitable commercially available processor. Processor 302 digitally communicates with system memory 304 via system bus 312, which may comprise a data bus, control bus, and address bus for communication between processor 302 and memory 304. CPU 302 is also coupled to the I/O circuitry 306 by system bus 312 to permit data transfers with peripheral devices.

I/O circuitry 306 provides an interface between CPU 302 and such peripheral devices as display device 308, input device 310, audio output 334 and/or any other I/O device. For example, a mouse used as input device 310 may digitally communicate with processor 302 through a serial port 306 that is coupled to system bus 312. Other interfaces, such as a game port or a universal serial bus (USB) or fire wire, may also provide digital communication between a peripheral device and processor 302. I/0 circuitry 306 may also include latches, registers and direct memory access (DMA) controllers employed for interface with peripheral and other devices. Audio output 334 may comprise one or more speakers employed by a headphone or speaker system.

Display device 308 is for displaying objects, video information, backgrounds as described herein, graphics controls as described herein, graphics-based user interfaces as described herein, and other visual representations of data. Display device 308 may comprise a cathode ray tube (CRT), liquid crystal display (LCD), organic light emitting diode (OLED), or plasma display, of the types commercially available from a variety of manufacturers. Display device 308 may also comprise one or more optical modulation devices, or the like, used in projecting an image. Projection display devices that project an image onto a receiving surface are becoming more popular, less expensive, more compact; and may employ one or more optical modulation technologies as well as a variety of individual designs. Common optical modulation devices include those employing liquid crystal display (LCD) technology and digital mirror device (DMD) technology. When used as a display device for a computer, these projection devices provide the potential for a much larger image size and user interface. Since images output by these devices may encounter keystone distortion, many projectors are designed or configured to mechanically or digitally reduce keystone distortion—either by manual (user) feedback or automated feedback using one or more sensors.

Display device 308 may also digitally communicate with system bus 306 via a separate video interface, such as a video adapter 346. Video adapter 346 may be responsible for assisting processor 302 with video graphics processing, and may be responsible for such functions as resolution up conversion, down conversion and suppression of portions of a maximum image size not being used. Video adapter 346 may be a separate graphics card or graphics processor available from a variety of vendors that are well known in the art.

Input device 310 allows a user to enter commands and information into the computer system 300, and may comprise a keyboard, a mouse, a position-sensing pad on a laptop computer, a stylus working in cooperation with a position-sensing display on a PDA, or the like. Other input devices may include a remote control, microphone, joystick, game pad, scanner, or the like. As a further alternative, input device 332 may be any set of switches capable of communicating a user input to computer system 350. Therefore, as used herein, the term input device will refer to any mechanism or device for entering data and/or pointing to a particular location on an image of a computer display. Input as described herein may also come through intermediary devices. For example, a remote control may communicate directly with processor 302, or through an intermediary processor included in another device such as a VCR, television, a hybrid entertainment device such as a set-top box, or projector 308. The user may then input information to computer system 300 using an infrared remote control device that communicates first with the intermediary device, and then to processor 302.

In operation, input device 332 allows a user to enter input such as commands and information related to a desired background size. The user input may then be analyzed by processor 302 to determine desired video information and set up changes, such as re-positioning icons. If desired, visual feedback may be given to the user at various stages of the input and background change via display device 308. In one embodiment, a graphics-based user interface implemented by computer system 300 is programmed to respond to commands from processor 302 to display graphics controls such as those described above. To display a particular graphics control, processor 302 issues an appropriate command, followed by an identification of data that is to be used to construct the graphics control. As described above, such data comprises a number of background control tools that allow a user to change a background size, when displayed. The graphics control may then store and call a bitmap of pixel values relating to each background control tool displayed thereon. System memory 304 may also store a bitmap or similar file that corresponds to an image previously used as the background. The present invention may be practiced in the context of an application program that runs on an operating system implemented by computer system 300 or in combination with other program modules on computer system 300.

The present invention may be practiced using a range of computer systems. In addition to personal computers such as desktop computers and laptop computers, a variety of other computer systems and computer devices employing a digital processor, memory and a display device may implement the present invention. Handheld computers and other small portable digital devices such as cell phones and digital cameras are increasingly integrating computer functionality, including the ability to access the resources of an external network such as the Internet and the ability to output video data to external devices. One current trend is hybrid entertainment devices that integrate the functionality of computer systems, stereos, and televisions. In addition, set-top boxes associated with cable television services are becoming much more sophisticated user interfaces as interactive services become available to cable customers. Gaming machines such as those employed in casinos have also progressed to fully digital systems that output digital video on LCD screens and other display devices. Any of these devices may employ and benefit from graphics-based user interfaces, backgrounds, control graphics, techniques, and methods described herein.

The scope of digital computer systems is expanding hurriedly and creating many systems and devices that may employ the present invention. A merging of television, video, and computer functions into a single device also adds value to the present invention since the sensitivity to image quality and size is high in applications such as motion picture viewing. Video game consoles that use large display devices and game related graphics user interfaces may also benefit from the present invention. In this case, user input tools may comprise joysticks, game pads, driving wheels and other video game interfaces. In general, any digital device that employs an output display device such as a projector, LCD device, plasma device, etc., for improved image display and control may benefit from the present invention. In addition, the projector, LCD device or plasma device may itself include its own graphics-based user interface that employs systems and methods described herein. Moreover, those skilled in the art will appreciate that the invention may be practiced with other computer system configurations, multiprocessor systems, microprocessor-based or programmable consumer electronics, minicomputers, mainframe computers, and the like. The present invention may also be practiced on any system running a graphics-based user interface from a computer-readable memory such as internal electronic memory, magnetic-based mass storage, and/or optical-based mass storage. The memory is programmed to implement the techniques described above.

In addition, embodiments of the present invention further relate to computer readable media that include program instructions for performing various computer-implemented techniques. The media and program instructions may be those specially designed and constructed for the purposes of the present invention, or any kind well known and available to those having skill in the computer software arts. Examples of computer-readable media include, but are not limited to, magnetic media such as hard disks, floppy disks, and magnetic tape; semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher-level code that may be executed by the computer using an interpreter.

Graphics controls and graphics-based user interfaces such as those described herein may be implemented using a number of computer languages. One suitable language is Java, available from Sun Microsystems of Sunnyvale, Calif. Another suitable language is the Microsoft Windows® programming environment, detailed in the Microsoft Windows 3.1 Guide to Programming, Redmond, Wash.: Microsoft Press, 1987-1992, in which the graphics controls may be implemented using operating system calls.

Although the foregoing invention has been described in some detail for purposes of clarity of understanding, those skilled in the art will recognize that various modifications may be made within the scope of the appended claims. For example, although background size quantification tool 45 of FIG. 2 includes a text display that quantifies the current size of background display 42, it is understood that graphics may be used to quantify the current background size. Such a graphic may include a pie chart that quantifies a percentage of the maximum image size being used. The invention is, therefore, not limited to the specific features and embodiments described herein and claimed in any of its forms or modifications within the scope of the appended claims.

What is claimed is:

1. A computer readable storage device having instructions stored thereon that, in response to execution, cause a display device including a processor to perform operations, comprising:
    displaying a graphical interface at a defined display size of the display device comprising displaying a background of the graphical interface with a perimeter within the defined display size, wherein the perimeter defines a usable area of the graphical interface;
    receiving input indicating a change to the perimeter of the background; and
    changing the displaying of the background according to the change to the perimeter concurrently with the displaying the graphical interface at the defined display size, wherein the change to the perimeter results in the perimeter remaining within and being less than the defined display size.

2. The computer readable storage device of claim 1, wherein the change to the perimeter comprises a change in position of the background.

3. The computer readable storage device of claim 1, wherein the operations further comprise displaying areas outside of the perimeter in a predetermined color.

4. The computer readable storage device of claim 3, wherein the predetermined color is black.

5. The computer readable storage device of claim 1, wherein the change to the perimeter comprises a change of an aspect ratio of the background.

6. The computer readable storage device of claim 1, wherein the change to the perimeter comprises a change of a shape of the background.

7. The computer readable storage device of claim 1, wherein the change to the perimeter comprises a change of a shape of the background to a selected logo.

8. The computer readable storage device of claim 1, wherein the changing the displaying of the background comprises adjusting a location of at least one of an icon, a control bar, a tool bar, or a window of the graphical interface to be within the perimeter of the background.

9. The computer readable storage device of claim 1, wherein the change to the perimeter comprises a change to a size of the background.

10. The computer readable storage device of claim 1, wherein the change to the perimeter comprises a change of a background image relative to which the background is sized.

11. The computer readable storage device of claim 1, wherein the change to the perimeter comprises a change of a geometric center of the background from a first value to a second value different from the first value.

12. The computer readable storage device of claim 1, wherein the display device is a projection-type display device.

13. The computer readable storage device of claim 1, wherein the display device comprises a display screen.

14. A method comprising:
displaying, by a display device including a processor, a graphical interface at a defined display size of the display device comprising displaying a background of the graphical interface with a perimeter within the defined display size, wherein the perimeter defines a usable area of the graphical interface;
receiving input specifying a change to the perimeter of the background; and
changing the displaying of the background to implement the change to the perimeter concurrently with displaying the graphical interface at the defined display size, wherein the changing the displaying comprises displaying the perimeter within and at a size less than the defined display size.

15. The method of claim 14, further comprising displaying areas outside of the perimeter in a predetermined color.

16. The method of claim 15, wherein the predetermined color is black.

17. The method of claim 15, wherein the input comprises a change of a shape of the background to a selected logo.

18. The method of claim 14, wherein the changing the displaying of the background further comprises adjusting a location of at least one of an icon, a control bar, a tool bar, or a window of the graphical interface to be within the perimeter of the background.

19. The method of claim 14, wherein the input comprises a change of a geometric center of the background from a first value to a second value different from the first value.

20. A system, comprising:
a processor, communicatively coupled to a memory that stores computer-executable instructions, that executes or facilitates execution of the computer-executable instructions, comprising:
a display background control tool configured to
display a graphical interface at a display size of a display device, wherein the graphical interface comprises a background with a perimeter displayed within the display size and the perimeter defines a usable area of the graphical interface,
receive input representing a change to the perimeter of the background, and
adjust the display of the background to cause the change to the perimeter while displaying the graphical interface at the display size, wherein after the display is adjusted, the perimeter remains within and is at a size less than the display size.

21. The system of claim 20, wherein the display background control tool is further configured to display areas outside of the perimeter in a predetermined color.

22. The system of claim 20, wherein the input comprises a change of a shape of the background to a selected logo.

23. The system of claim 20, wherein the display background control tool is further configured to adjust a location of at least one of an icon, a control bar, a tool bar, or a window of the graphical interface to be within the perimeter of the background.

24. The system of claim 20, wherein the input comprises a change of a geometric center of the background from a first value to a second value different from the first value.

25. A system, comprising:
means for displaying a graphical interface at a defined display size of a display device, wherein the graphical interface comprises a background with a perimeter displayed within the defined display size and the perimeter defines a usable area of the graphical interface; and
means for receiving input indicating a change to the perimeter of the background,
wherein the means for displaying comprises means for modifying the displaying of the background according to the change to the perimeter concurrently with the displaying of the graphical interface at the defined display size and means for displaying the perimeter within and at a size less than the defined display size.

26. The system of claim 25, wherein the means for displaying further comprises means for displaying areas outside of the perimeter in a predetermined color.

27. The system of claim 26, wherein the input comprises a change of a shape of the background to a selected logo.

28. The system of claim 25, wherein the means for modifying comprises means for adjusting a location of at least one of an icon, a control bar, a tool bar, or a window of the graphical interface to be within the perimeter after the change.

29. The system of claim 28, wherein the input comprises a change of a geometric center of the background from a first value to a second value different from the first value.

30. A projection-type display device, comprising:
a display component configured to initiate a display of a graphical interface at a defined display size of the projection-type display device, wherein the graphical interface comprises a background with a perimeter within the defined display size and the perimeter defines a usable area of the graphical interface; and
a display background control tool configured to
receive an input specifying a change to the perimeter of the background, and
instruct the display component to change the display of the background to implement the change to the perimeter concurrently with the display of the graphical interface at the defined display size, wherein the change to the perimeter results in the perimeter remaining within the defined display size and having a size less than the defined display size.

31. The projection-type display device of claim 30, wherein the display background control tool is further configured to instruct the display component to display areas outside of the perimeter in a predetermined color.

32. The projection-type display device of claim 30, wherein the input comprises a change of a shape of the background to a selected logo.

33. A method, comprising:
   displaying, by a projection display device including a processor, a graphical interface at a defined display size of the display device comprising displaying a background of the graphical interface with a perimeter within the defined display size, wherein the perimeter defines a usable area of the graphical interface;
   receiving input indicative of a change to the perimeter of the background; and
   altering the displaying of the background to result in the change to the perimeter concurrently with the displaying of the graphical interface at the defined display size, wherein the altering the displaying comprises displaying the perimeter within and at a size less than the defined display size.

34. The method of claim 33, further comprising displaying areas outside of the perimeter in a predetermined color.

35. A computer-readable storage device having instructions stored thereon that, in response to execution, cause a projection display device including a processor to perform operations, comprising:
   displaying a graphical interface at a defined display size of the display device comprising displaying a background of the graphical interface with a perimeter within the defined display size, wherein the perimeter defines a usable area of the graphical interface;
   receiving input indicating a change to the perimeter of the background; and
   changing the displaying of the background to satisfy the change to the perimeter concurrently with the displaying the graphical interface at the defined display size, wherein the changing the displaying comprises displaying the perimeter within and at a size less than the defined display size.

36. The computer-readable storage device of claim 35, wherein the operations further comprise displaying areas outside of the perimeter in a predetermined color.

37. The computer-readable storage device of claim 35, wherein the input comprises a change of a shape of the background to a selected logo.

38. A system, comprising:
   means for displaying a graphical interface at a defined display size of a projection-type display device, wherein display of the graphical interface comprises display of a background with a perimeter within the defined display size and the perimeter defines a usable area of the graphical interface; and
   means for receiving an input specifying a change to the perimeter of the background,
   wherein the means for displaying comprises means for adjusting the display of the background to carry out the change to the perimeter concurrently with the displaying of the graphical interface at the defined display size and means for displaying the perimeter within and at a size less than the defined display size.

39. The system of claim 38, further comprising means for displaying areas outside of the perimeter in a predetermined color.

40. The system of claim 38, wherein the input comprises a change of a shape of the background to a selected logo.

* * * * *

UNITED STATES PATENT AND TRADEMARK OFFICE
CERTIFICATE OF CORRECTION

PATENT NO.        : 8,610,742 B2               Page 1 of 1
APPLICATION NO.   : 11/765296
DATED             : December 17, 2013
INVENTOR(S)       : Plut It is certified that error appears in the above-identified patent and that said Letters Patent is hereby corrected as shown below:

In the Specifications

In Column 3, Line 43, delete "DESCRIPTION" and insert -- DETAILED DESCRIPTION --, therefor.

In Column 5, Line 59, delete "an CRT" and insert -- a CRT --, therefor.

In Column 12, Line 52, delete "800=600 pixels." and insert -- 800×600 pixels. --, therefor.

In Column 14, Line 9, delete "I/0" and insert -- I/O --, therefor.

Signed and Sealed this
Sixth Day of May, 2014

Michelle K. Lee
*Deputy Director of the United States Patent and Trademark Office*